(12) United States Patent
Qin et al.

(10) Patent No.: US 12,104,459 B2
(45) Date of Patent: Oct. 1, 2024

(54) SEAL FOR REPEATEDLY SWITCHABLE STEPLESS FRACTURING SLIDING SLEEVE

(71) Applicant: Guangzhou JST Seals Technology Co., Ltd., Guangdong (CN)

(72) Inventors: Zeming Qin, Guangdong (CN); Guangming Huang, Guangdong (CN); Houning Li, Guangdong (CN)

(73) Assignee: Guangzhou JST Seals Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/131,356

(22) Filed: Apr. 5, 2023

(65) Prior Publication Data

US 2024/0125209 A1 Apr. 18, 2024

(30) Foreign Application Priority Data

Oct. 12, 2022 (CN) .......................... 202211246411.X

(51) Int. Cl.
*E21B 33/12* (2006.01)
*E21B 34/14* (2006.01)

(52) U.S. Cl.
CPC .......... *E21B 34/14* (2013.01); *E21B 2200/06* (2020.05)

(58) Field of Classification Search
CPC ...... E21B 33/12; E21B 33/1208; E21B 34/14; E21B 2200/06
See application file for complete search history.

(56) References Cited

U.S. PATENT DOCUMENTS

| 4,576,385 | A | * | 3/1986 | Ungchusri | F16J 15/184 |
| | | | | | 277/540 |
| 2014/0124193 | A1 | * | 5/2014 | Rowe | E21B 33/1212 |
| | | | | | 166/115 |
| 2016/0237777 | A1 | * | 8/2016 | Curington | E21B 17/07 |
| 2017/0328472 | A1 | * | 11/2017 | LoGiudice | F16J 15/025 |

* cited by examiner

*Primary Examiner* — Matthew R Buck

(57) ABSTRACT

A seal for a repeatedly switchable stepless fracturing sliding sleeve includes a C-ring, and two A-rings, two jackets and two B-rings symmetrically provided in sequence on two sides of the C-ring in an axial direction. A mounting cavity open in a direction away from the C-ring is formed in the jacket, and a U-shaped leaf spring is provided therein. The A-ring covers a supporting lip of the jacket and has a protruding portion extending into the mounting, and the A-ring is provided with a through hole allowing the mounting cavity to be in communication with an external fluid. When the whole seal is pressed forwardly or reversely by the fluid, the supporting lip can support and tightly abut on the A-ring, and the external fluid can enter the mounting cavity via the through hole and provide a pressure for a sealing lip to tightly abut on a sealing surface.

9 Claims, 3 Drawing Sheets

SEAL FOR REPEATEDLY SWITCHABLE STEPLESS FRACTURING SLIDING SLEEVE

CROSS REFERENCE TO RELATED APPLICATIONS

The present application claims the benefit of Chinese Patent Application No. 202211246411.X filed on Oct. 12, 2022, the contents of which are incorporated herein by reference in their entirety.

TECHNICAL FIELD

The present disclosure relates to a sliding sleeve tool for petroleum well cementation, and in particular to a seal for a repeatedly switchable stepless fracturing sliding sleeve.

BACKGROUND

A repeatedly switchable stepless fracturing sliding sleeve is usually used in well cementing operations. The fracturing sliding sleeve can be switched on and off repeatedly. It has the technical advantages of high universality, unlimited fracturing stage, full-bore after frac, switchable individual stage, multiple repeated fracturing operations on a single stage, immobile string that achieves high efficient development, etc.

The sealing of a repeatedly switchable stepless fracturing sliding sleeve needs to undergo repeated switching actions, and extremely high requirements are thus put forward on the seal with great technical difficulties. Firstly, it is required that the seal should not be damaged under multiple bidirectional repeated high-pressure impacts. Secondly, it is required that the seal should maintain the sealing performance in multiple reciprocating motions. Thirdly, in addition to the aforesaid two conditions, the seal needs to ensure no leakage when sealing liquids and gases at normal temperature and a high temperature as well.

The performance of the seal for the repeatedly switchable stepless fracturing sliding sleeve has direct influence on the reliability and safety of the repeatedly switchable stepless fracturing sliding sleeve.

Ball-throwing type sliding sleeve seals used at present are mostly conventional bidirectional elastic energy storage seals or V-shaped combination seals that cannot meet the requirement of multiple reciprocating actions of a repeatedly switchable stepless fracturing sliding sleeve in terms of performance. This is because: 1, under multiple high-pressure impacts, the spring force of the conventional bidirectional elastic energy storage seal may be continuously attenuated to cause degradation in sealing performance and even leakage; 2, under multiple high-pressure impacts, a jacket of the conventional bidirectional elastic energy storage seal is prone to cracking, leading to a complete failure; 3, due to relatively insufficient sealability of the V-shaped combination seal, leakage is easy to occur when switching between high and low temperatures, and the resistance of sliding is great.

Therefore, the ball-throwing type sliding sleeve seals used at present cannot meet the requirement of multiple reciprocating sliding for the repeatedly switchable stepless fracturing sliding sleeve.

SUMMARY

The technical problem to be solved in the present disclosure is to provide a seal for a repeatedly switchable stepless fracturing sliding sleeve that can meet the usage requirements of sliding for more than 1,000 times without leakage of sealed liquids and gases under working conditions such as a working temperature of 4° C. to 180° C. and a bidirectional working pressure of at least 15,000 psi.

To solve the above technical problem, the present disclosure adopts the following technical solutions.

A seal for a repeatedly switchable stepless fracturing sliding sleeve includes a C-ring, two A-rings, two jackets and two B-rings. The two B-rings, the two jackets and the two A-rings are symmetrically provided in sequence on two sides of the C-ring in an axial direction of the C-ring. A mounting cavity which is open in a direction away from the C-ring is formed in the jacket, and a U-shaped leaf spring is provided in the mounting cavity. The A-ring covers a supporting lip of the jacket and has a protruding portion that extends into the mounting cavity of the jacket, and the A-ring is provided with a through hole allowing the mounting cavity to be in communication with an external fluid. When the whole seal is pressed forwardly or reversely by the fluid, the supporting lip of the jacket is capable of supporting and tightly abutting on the A-ring, to allow the external fluid to enter the mounting cavity via the through hole and provide a pressure for a sealing lip of the jacket to tightly abut on a sealing surface.

In a preferred solution of the present disclosure, a gasket may be provided at the bottom of the mounting cavity, opposite to the bottom of the U-shaped leaf spring.

In a preferred solution of the present disclosure, The B-ring may be provided, on a side close to the jacket, with a first groove having a Y-shaped cross section, the jacket may be provided with a first protrusion having a Y-shaped cross section, and the first protrusion may be in matching connection with the first groove. The B-ring may be provided, on a side close to the C-ring, with a second protrusion having a trapezoidal cross section, the C-ring may be provided with a second groove having a trapezoidal cross section, and the second protrusion may be in matching connection with the second groove.

In a preferred solution of the present disclosure, the sealing lips may be symmetrically arranged on an inner race and an outer race of the jacket. The sealing lips may include a primary sealing lip and an auxiliary sealing lip. The primary sealing lip may be located on a side close to the A-ring. A mounting interference magnitude of the primary sealing lip may be greater than that of the auxiliary sealing lip.

In a preferred solution of the present disclosure, a curved surface radius of the primary sealing lip may be greater than that of the auxiliary sealing lip.

In a preferred solution of the present disclosure, a mounting interference magnitude of the B-ring may be less than that of the jacket.

In a preferred solution of the present disclosure, the A-ring may be made of a polyether-ether-ketone (PEEK) material.

In a preferred solution of the present disclosure, the C-ring may be made of a PEEK material.

In a preferred solution of the present disclosure, the B-ring may be made of a modified polytetrafluoroethylene (PTFE) material.

In a preferred solution of the present disclosure, the jacket may be made of a modified PTFE material.

Compared with the prior art, the seal for a repeatedly switchable stepless fracturing sliding sleeve provided in the present disclosure has the following beneficial effects.

In the seal for a repeatedly switchable stepless fracturing sliding sleeve of the present disclosure, the supporting lip of the jacket is used to support the bottom of the A-ring, thereby increasing the stressed area and sharing the stress on the root of the A-ring. Thus, the root of the A-ring can be prevented from being damaged because of bearing an excessive pressure, and the service life of the seal can be prolonged. Moreover, when an external fluid is prevented from entering the mounting cavity by the abutting seal of the supporting lip of the jacket with the A-ring, the external fluid can still enter the mounting cavity via the through hole of the A-ring. Thus, an outward tensile force is provided for the outer race and the inner race of the jacket by means of the pressure of the fluid, allowing the sealing lips on the outer race and the inner race of the jacket to tightly abut on a sealing surface (e.g., a pipe wall) and thus improving the sealing performance of the seal. Accordingly, the usage requirements of sliding for more than 1,000 times without leakage of sealed liquids and gases under working conditions such as a working temperature of 4° C. to 180° C. and a bidirectional pressure of at least 15,000 psi can be met.

BRIEF DESCRIPTION OF THE DRAWINGS

To describe the technical solutions in the embodiments of the present disclosure more clearly, a brief introduction to the accompanying drawings for the embodiments will be provided below.

LIST OF REFERENCE NUMERALS

1—C-ring, 2—A-ring, 3—jacket, 4—B-ring, 5—mounting cavity, 6—U-shaped leaf spring, 7—through hole, 8—gasket, 9—sliding sleeve, 10—pipe, 11—position-limiting end cover, 12—position-limiting step, 31—supporting lip, 32—sealing lip, 321—primary sealing lip, 322—auxiliary sealing lip, a—supporting surface a, and b—supporting surface b.

DETAILED DESCRIPTION

The present disclosure will be described in more detail below with reference to the accompanying drawings and embodiments. The following embodiments are illustrative of the present disclosure and are not intended to limit of the scope of the present disclosure.

In the description of the present disclosure, it should be understood that terms such as "upper", "lower", "left", "right", "front", "rear", "top" and "bottom" refer to orientation or position relationships in accordance with the drawings for convenience of description and for the purpose of simplicity. These terms are not intended to indicate or imply that the mentioned device or components must have a specific orientation or must be constructed and operated in a specific orientation. Therefore, these terms should not be understood as a limitation to the present disclosure. It should be understood that the terms such as "first" and "second" are used herein to describe various information which, however, should not be limited to these terms, and these terms are only used to distinguish the information of a same type from one another. For example, "first" information may be referred to as "second" information without departing from the scope of the present disclosure, and vice versa.

Figure 1:
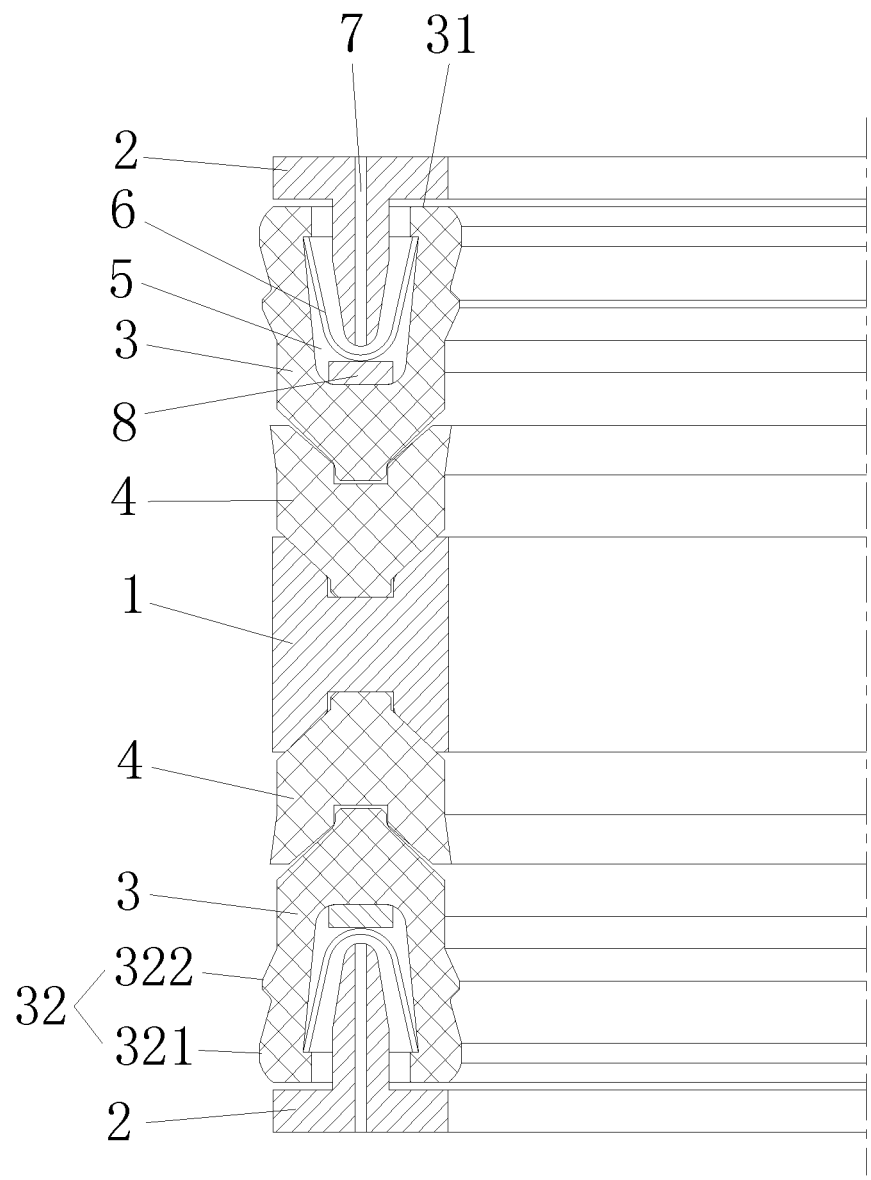
FIG. 1 is an axial sectional view of a seal for a repeatedly switchable stepless fracturing sliding sleeve according to an embodiment of the present disclosure.
Figure 2:
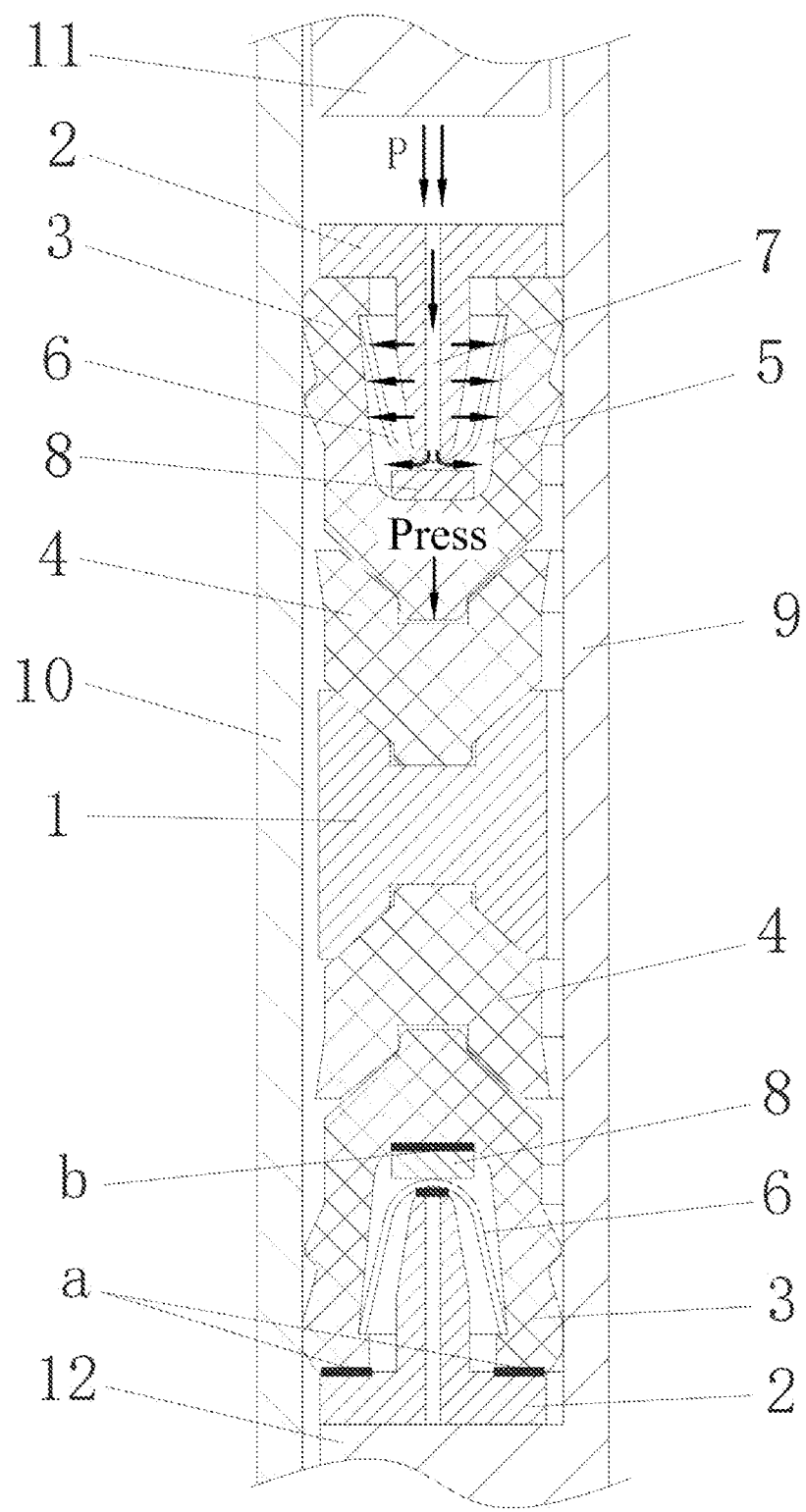
FIG. 2 illustrates a structural schematic view of a seal when being pressed forwardly by a fluid.
Figure 3:
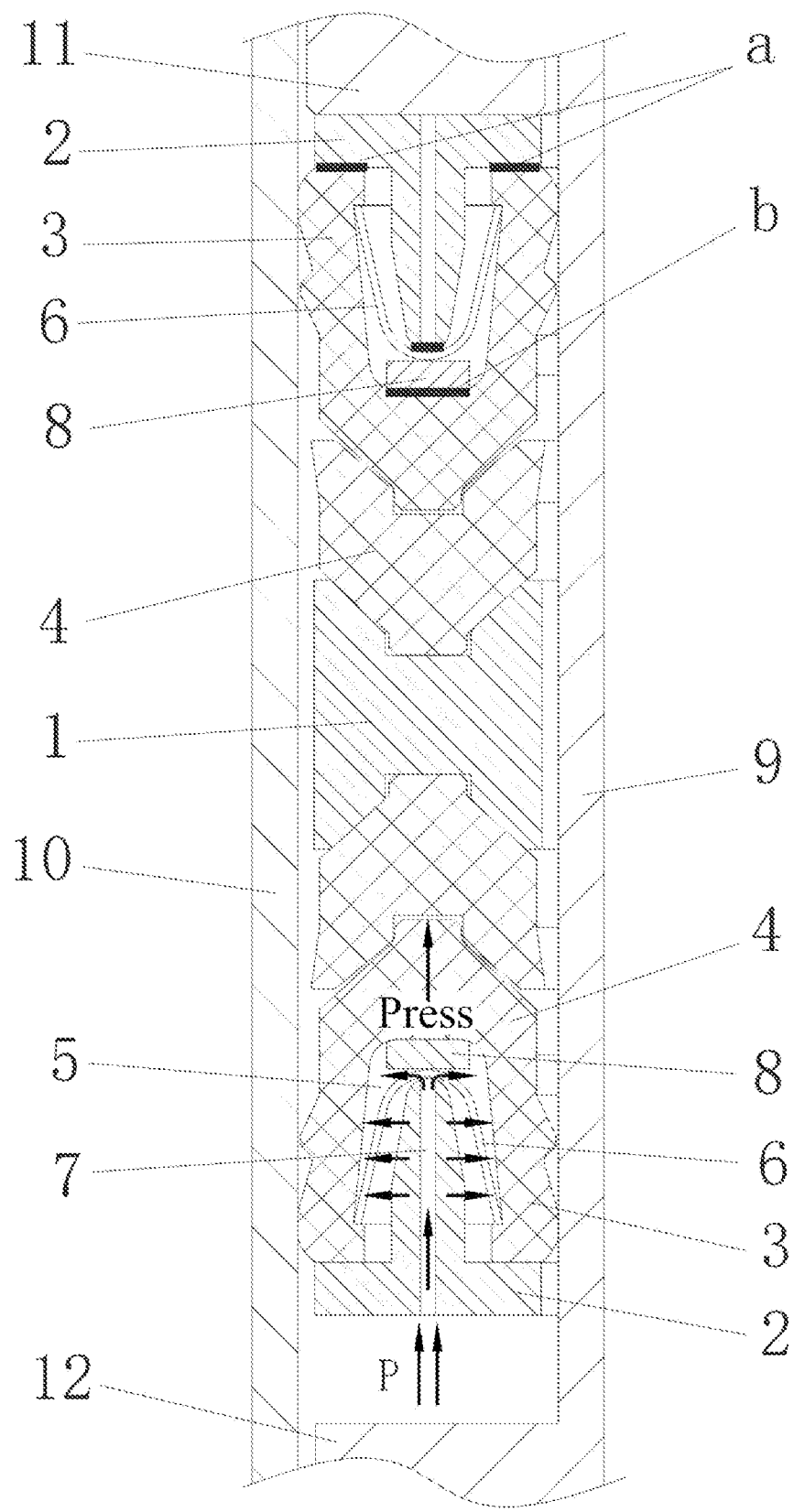
FIG. 3 illustrates a structural schematic view of a seal when being pressed reversely by a fluid.

As shown in FIG. 1 to FIG. 3, a seal for a repeatedly switchable stepless fracturing sliding sleeve according to an embodiment of the present disclosure includes a C-ring 1, two A-rings 2, two jackets 3 and two B-rings 4. The two B-rings 4, the two jackets 3 and the two A-rings 2 are symmetrically provided in sequence on two sides of the C-ring 1 in an axial direction of the C-ring 1. A mounting cavity 5 which is open in a direction away from the C-ring 1 is formed in the jacket 3, and a U-shaped leaf spring 6 is provided in the mounting cavity 5. The A-ring 2 covers a supporting lip 31 of the jacket 3 and has a protruding portion that extends into the mounting cavity 5 of the jacket 3, and the A-ring 2 is provided with a through hole 7 allowing the mounting cavity 5 to be in communication with an external fluid. When the whole seal is pressed forwardly or reversely by the fluid, the supporting lip 31 of the jacket 3 is capable of supporting and tightly abutting on the A-ring 2, and the external fluid can enter the mounting cavity 5 via the through hole 7 and provide a pressure for a sealing lip 32 of the jacket 3 to tightly abut on a sealing surface.

Herein, the C-ring 1 is made of a PEEK material and located right in the middle of the whole seal and serves for reducing a gap between the seal and a pipe wall and improving the compression resistance of the seal. The B-ring 4 is made of a PTFE material, preferably a modified PTFE material, and more than one B-ring 4 may be provided to offer an enhanced sealing function under pressure. The jacket 3 is made of a PTFE material, preferably a modified PTFE material, and serves for offering a main sealing function under pressure. The U-shaped leaf spring 6 disposed in the jacket 3 is made of an alloy material and serves for providing an initial sealing acting force for the jacket 3. The A-ring 2 is made of a PEEK material and serves for supporting the whole seal and protecting the supporting lip 31 of the jacket 3 from being damaged due to a groove (namely, a gap between the seal and the pipe wall) or pressed into the groove gap when the seal is under a pressure at an end thereof. Thus, the C-ring 1, the B-ring 4, the jacket 3 and the A-ring 2 can coordinate with one another to bear pressures simultaneously in two directions.

The seal for a repeatedly switchable stepless fracturing sliding sleeve according to the embodiment of the present disclosure operates in accordance with the following principle.

After integrated assembly of the B-rings 4, the jackets 3 and the A-rings 2 which are symmetrically arranged in sequence on the two sides of the C-ring 1, the whole seal is mounted on a sliding sleeve 9 and is limited between a position-limiting end cover 11 and a position-limiting step 12. Herein, the position-limiting end cover 11, the position-limiting step 12, and the sliding sleeve are assembled into an integrated structure. The sliding sleeve which is mounted with the seal is capable of moving in a pipe 10. The sliding sleeve is capable of controlling switching on and off of a pipeline by sliding to specified positions. During switching, the outer race (namely, the B-rings 4 and the jackets 3) of the seal moves axially relative to the inner wall of the pipe 10. Further, due to alternate switching actions, the seal bears forward and reverse fluid pressures, as shown in FIG. 2 and FIG. 3.

When the whole seal is pressed forwardly by the fluid (see "P" direction in FIG. 2), the whole seal moves down onto the position-limiting step 12. In such a case, the A-ring 2 located on the lower portion of the structure shown in FIG. 2 tightly abuts on the supporting lip 31 of the jacket 3 to form a supporting surface a, thereby increasing the stressed area. During downward movement of the whole seal, the external fluid is capable of entering the mounting cavity 5 via the gap between the A-ring 2 and the supporting lip 31 of the jacket 3 and the through hole 7 of the A-ring 2, which are located on the upper portion of the structure shown in FIG. 2. Though the external fluid may be obstructed from entering the mounting cavity 5 when the A-ring 2 located on the upper portion of the structure shown in FIG. 2 tightly abuts on the supporting lip 31 of the jacket 3, the external fluid can still enter the mounting cavity 5 easily via the through hole 7 of the A-ring 2 located on the upper portion of the structure shown in FIG. 2. Thus, an outward tensile force is provided for the outer race and the inner race of the jacket 3 located on the upper portion of the structure shown in FIG. 2 by means of the pressure of the fluid, facilitating the sealing lips 32 on the outer race and the inner race of the jacket 3 to tightly abut on the sealing surface (e.g., the pipe wall).

Similarly, when the whole seal is pressed reversely by the fluid (see "P" direction in FIG. 3), the whole seal moves up onto the position-limiting end cover 11. In such a case, the A-ring 2 located on the upper portion of the structure shown in FIG. 3 tightly abuts on the supporting lip 31 of the jacket 3 to form a supporting surface a, thereby increasing the stressed area. During upward movement of the whole seal the external fluid is capable of entering the mounting cavity 5 via the gap between the A-ring 2 and the supporting lip 31 of the jacket 3 and the through hole 7 of the A-ring 2, which are located on the lower portion of the structure shown in FIG. 3. Though the external fluid may be obstructed from entering the mounting cavity 5 when the A-ring 2 located on the lower portion of the structure shown in FIG. 3 tightly abuts on the supporting lip 31 of the jacket 3, the external fluid can still enter the mounting cavity 5 easily via the through hole 7 of the A-ring 2 located on the lower portion of the structure shown in FIG. 3. Thus, an outward tensile force is provided for the outer race and the inner race of the jacket 3 located on the lower portion of the structure shown in FIG. 2 by means of the pressure of the fluid, facilitating the sealing lips 32 on the outer race and the inner race of the jacket 3 to tightly abut on the sealing surface (e.g., the pipe wall).

As can be seen, the technical keys of the seal for a repeatedly switchable stepless fracturing sliding sleeve according to the embodiment of the present disclosure are as follows. The supporting lip 31 of the jacket 3 is used to support the bottom of the A-ring 2, thereby increasing the stressed area and sharing the stress on the root of the A-ring. Thus, the root of the A-ring 2 can be prevented from being damaged because of bearing an excessive pressure, and the service life of the seal can be prolonged. Moreover, when the external fluid is obstructed from entering the mounting cavity 5 by the abutting of the supporting lip 31 of the jacket 3 against the A-ring 2, the external fluid can still enter the mounting cavity 5 easily via the through hole 7 of the A-ring 2. Thus, an outward tensile force is provided for the outer race and the inner race of the jacket 3 by means of the pressure of the fluid, enabling the sealing lips 32 on the outer race and the inner race of the jacket 3 to tightly abut on the sealing surface (e.g., the pipe wall) and thus improving the sealing performance of the seal. Accordingly, the usage requirements of sliding for at least 1,000 times and guaranteeing no leakage of sealed liquids and gases under working conditions such as a working temperature of 4° C. to 180° C. and a bidirectional pressure of at least 15,000 psi can be met.

Exemplarily, a gasket 8 is provided at the bottom of the mounting cavity 5, opposite to the bottom of the U-shaped leaf spring 6. The gasket 8 can be designed to protect the jacket 3, preventing the degradation of the elastic performance of the U-shaped leaf spring 6 resulting from the U-shaped leaf spring 6 being embedded into the jacket 3 under multiple high-pressure impacts, or the damage of the mounting cavity 5 of the jacket 3. Thus, the resilience and sealability of the sealing lip 32 of the jacket 3 are improved, and the capability of resisting reverse high pressure and repeated impacts is guaranteed. The service life of the seal is further prolonged. Meanwhile, a large supporting surface b can be formed between the gasket 8 and the jacket 3, thereby further increasing the stressed area and prolonging the service life of the seal. Moreover, the stability of the seal under bidirectional repeated impacts is guaranteed effectively.

Exemplarily, the B-ring 4 is preferably a Y-shaped sealing ring. The B-ring 4 is provided, on a side close to the jacket 3, with a first groove having a Y-shaped cross section, the jacket 3 is provided with a first protrusion having a Y-shaped cross section, and the first protrusion is in matching connection with the first groove. The B-ring 4 is provided, on a side close to the C-ring C, with a second protrusion having a trapezoidal cross section, the C-ring 1 is provided with a second groove having a trapezoidal cross section, and the second protrusion is in matching connection with the second groove. Thus, with a concave-convex matching structure, the structure involving various components is more compact while the assembly of the whole seal is facilitated, and dynamic sealing and static sealing can be switched more stably and reliably.

Exemplarily, the sealing lips 32 are symmetrically arranged on the inner race and the outer race of the jacket 3. The sealing lips 32 include a primary sealing lip 321 and an auxiliary sealing lip 322. The primary sealing lip 321 is located on a side close to the A-ring 2. A mounting interference magnitude of the primary sealing lip 321 is greater than that of the auxiliary sealing lip 322. A curved surface radius 321 of the primary sealing lip is greater than that of the auxiliary sealing lip 322. Such a design can guarantee that the primary sealing lip 321 slides more smoothly and also can guarantee that the primary sealing lip 321 provides sufficient strength in a static sealing state. The auxiliary sealing lip 322 plays a role in partial sealing and supporting balancing.

Exemplarily, the mounting interference magnitude of the B-ring 4 is less than that of the jacket 3, thereby facilitating mounting. However, when the B-ring 4 is under pressure in static sealing, the lip is flared to provide an excellent auxiliary sealing effect.

In the description of the present disclosure, it should be noted that, unless otherwise clearly specified, terms "connected with" and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

The foregoing are merely descriptions of the preferred embodiments of the present disclosure. It should be noted that several modifications and equivalents can be made by a person of ordinary skill in the art without departing from the technical principle of the present disclosure, and these modifications and equivalents shall also be deemed as falling within the protection scope of the present disclosure.

The invention claimed is:

1. A seal for a repeatedly switchable stepless fracturing sliding sleeve, comprising a C-ring, two A-rings, two jackets and two B-rings, wherein the two B-rings, the two jackets and the two A-rings are symmetrically provided in sequence on two sides of the C-ring in an axial direction of the C-ring; a mounting cavity which is open in a direction away from the C-ring is formed in each of the jackets, and a U-shaped leaf spring is provided in each of the mounting cavities; wherein each of the A-rings covers a supporting lip of one of the jackets, has a protruding portion that extends into the mounting cavity of the one of the jackets, and is provided with a through hole extending through the protruding portion thereof in the axial direction of the C-ring to allow the mounting cavity of the one of the jackets to be in communication with an external fluid; wherein a gasket is provided at a bottom of each mounting cavity, at a position corresponding to a bottom of the U-shaped leaf spring; and when the whole seal is pressed forwardly or reversely by the fluid in such a manner that the supporting lip of each one of the jackets supports and tightly abuts on one of the A-rings to form a supporting surface, the through hole of the one of the A-rings allows the external fluid to enter the mounting cavity of the respective one of the jackets so as to provide a pressure for sealing lips of the respective one of the jackets to tightly abut on sealing surfaces on the sliding sleeve and a downhole tubular member, respectively.

2. The seal for a repeatedly switchable stepless fracturing sliding sleeve according to claim 1, wherein each of the B-rings is provided, on a side close to respective one of the jackets, with a first groove having a Y-shaped cross section, each of the jackets is provided with a first protrusion having a Y-shaped cross section, and the first protrusion is in matching connection with the first groove; each of the B-rings is provided, on a side close to the C-ring, with a second protrusion having a trapezoidal cross section, the C-ring is provided with a second groove having a trapezoidal cross section, and the second protrusion is in matching connection with the second groove.

3. The seal for a repeatedly switchable stepless fracturing sliding sleeve according to claim 1, wherein the sealing lips of each of the jackets includes sealing lips respectively symmetrically arranged on an inner race and an outer race of the respective one of the jackets; the sealing lips of each of the jackets comprise an auxiliary sealing lip and a primary sealing lip located on a side close to the respective one of the A-rings and having a mounting interference magnitude greater than that of the respective auxiliary sealing lip.

4. The seal for a repeatedly switchable stepless fracturing sliding sleeve according to claim 3, wherein a curved surface radius of the primary sealing lip is greater than a curved surface radius of the auxiliary sealing lip.

5. The seal for a repeatedly switchable stepless fracturing sliding sleeve according to claim 4, wherein a mounting interference magnitude of each of the B-rings is less than a mounting interference magnitude of respective one of the jackets.

6. The seal for a repeatedly switchable stepless fracturing sliding sleeve according to claim 1, wherein the A-rings are made of a polyether-ether-ketone (PEEK) material.

7. The seal for a repeatedly switchable stepless fracturing sliding sleeve according to claim 1, wherein the C-ring is made of a PEEK material.

8. The seal for a repeatedly switchable stepless fracturing sliding sleeve according to claim 1, wherein the B-rings are made of a modified polytetrafluoroethylene (PTFE) material.

9. The seal for a repeatedly switchable stepless fracturing sliding sleeve according to claim 1, wherein the jackets are made of a modified PTFE material.

\* \* \* \* \*